United States Patent
Eling

(10) Patent No.: US 9,529,584 B2
(45) Date of Patent: Dec. 27, 2016

(54) SYSTEM AND METHOD FOR PREPARING VEHICLE FOR REMOTE REFLASH EVENT

(71) Applicant: GENERAL MOTORS LLC, Detroit, MI (US)

(72) Inventor: Russ Eling, LaSalle (CA)

(73) Assignee: GENERAL MOTORS LLC, Detroit, MI (US)

( * ) Notice: Subject to any disclaimer, the term of this patent is extended or adjusted under 35 U.S.C. 154(b) by 313 days.

(21) Appl. No.: 14/073,346

(22) Filed: Nov. 6, 2013

(65) Prior Publication Data

US 2015/0128123 A1    May 7, 2015

(51) Int. Cl.
- G06F 9/44 (2006.01)
- G06F 9/445 (2006.01)
- G07C 5/00 (2006.01)
- H04L 29/08 (2006.01)
- H04W 4/00 (2009.01)
- H04W 4/04 (2009.01)

(52) U.S. Cl.
CPC .............. G06F 8/67 (2013.01); G06F 8/665 (2013.01); G07C 5/008 (2013.01); H04L 67/12 (2013.01); H04W 4/001 (2013.01); H04W 4/046 (2013.01)

(58) Field of Classification Search
CPC .................................. G07C 5/008; G06F 8/65
USPC ............................................... 701/2; 717/168
See application file for complete search history.

(56) References Cited

U.S. PATENT DOCUMENTS

| | | | | |
|---|---|---|---|---|
| 7,366,589 | B2* | 4/2008 | Habermas | G06F 8/65 701/1 |
| 7,398,176 | B2* | 7/2008 | Bertness | B60C 23/0408 340/436 |
| 8,482,395 | B2* | 7/2013 | Rysenga | B60C 23/0416 340/442 |
| 8,519,562 | B2* | 8/2013 | Gibbs | G01R 31/045 307/9.1 |
| 8,655,541 | B2* | 2/2014 | You | H04L 67/34 340/438 |
| 8,797,958 | B2* | 8/2014 | Waldner | G07C 5/008 370/328 |
| 9,059,485 | B2* | 6/2015 | Dickinson | B60L 3/12 |
| 9,075,686 | B2* | 7/2015 | Alrabady | G06F 8/65 |
| 2005/0288830 | A1* | 12/2005 | Reeser | G07C 5/085 701/2 |
| 2007/0185624 | A1* | 8/2007 | Duddles | G06F 8/665 701/1 |
| 2010/0228404 | A1* | 9/2010 | Link, II | G06F 9/44542 701/1 |

(Continued)

Primary Examiner — Francisco Aponte
(74) Attorney, Agent, or Firm — Leydig, Voit & Mayer, Ltd.

(57) ABSTRACT

Implementations of the present disclosure contemplate utilizing the communicative connections between a telematics service provider (TSP) and a telematics unit in a vehicle to schedule a remote reflash event, issue instructions to the vehicle to prepare for the remote reflash event, and to administer the remote reflash event. A TSP may determine that the vehicle is presently running software for which an update is desirable. Thereafter, the TSP may transmit instructions to the vehicle to make preparations for the remote reflash event. In some implementations, the instructions may cause the vehicle to obtain a higher level of battery charge during its next drive cycle or charging event in anticipation of the remote reflash event.

19 Claims, 3 Drawing Sheets

(56) References Cited

U.S. PATENT DOCUMENTS

| | | | |
|---|---|---|---|
| 2011/0082621 A1* | 4/2011 | Berkobin | B60L 11/1824 701/31.4 |
| 2011/0130892 A1* | 6/2011 | Dulzo | G06F 8/665 701/2 |
| 2012/0038324 A1* | 2/2012 | Humphrey | B60L 3/0069 320/138 |
| 2012/0149323 A1* | 6/2012 | Springs | B60R 25/403 455/404.1 |
| 2013/0031540 A1* | 1/2013 | Throop | G06F 8/665 717/173 |
| 2013/0231052 A1* | 9/2013 | Eling | H04L 63/0876 455/41.2 |
| 2013/0245884 A1* | 9/2013 | Forutanpour | G01S 19/51 701/36 |
| 2014/0282467 A1* | 9/2014 | Mueller | G06F 8/665 717/170 |

* cited by examiner

SYSTEM AND METHOD FOR PREPARING VEHICLE FOR REMOTE REFLASH EVENT

TECHNOLOGY FIELD

The present disclosure relates generally to vehicular telematics system and more specifically to the use of a telematics unit within an electric vehicle to notify vehicular systems of a pending remote reflash event and to schedule preparations for the pending remote reflash event.

BACKGROUND

Numerous advances have been made in the field of automotive electronics in recent decades. The degree to which electronic control units (ECUs) and electronic vehicle diagnostic monitoring systems have been integrated into modern vehicles continues to increase. Many modern vehicles contain numerous ECUs including, for example, engine control modules (ECMs), powertrain control modules (PCMs), transmission control modules (TCMs), brake control modules (EBCMs), suspension control modules (SCMs), and body control modules (BCMs).

Telematics units within mobile vehicles, which may be controlled by an ECU referred to as a telematic control unit (ICU), provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Once provisioned and activated, telematics units can be utilized by a subscriber to obtain telematics services, such as those described herein, from the TSP.

One service that may be provided by a TSP is the remote provision of embedded software updates. A vehicle is able to obtain the latest embedded software versions for its numerous ECUs from an OEM through its connection to a TSP via its telematics unit. The connection with the TSP allows the telematics unit to download the latest versions of ECU embedded software from the TSP. TSPs can also remotely control the embedded software update process in an event known as a remote reflash event. In this manner, an OEM, through the services provided by a TSP, can ensure that a fleet of vehicles is running the latest version of ECU embedded software without requiring that each individual vehicle in the fleet visit a dealership or other service station.

SUMMARY OF THE INVENTION

Implementations of the present disclosure contemplate utilizing the communicative connections between a telematics service provider (TSP) and a telematics unit in a vehicle to schedule a remote reflash event, issue instructions to the vehicle to prepare for the remote reflash event, and to administer the remote reflash event. A TSP may determine that the vehicle, which may be a member of a fleet of vehicles identified by or defined by the TSP, is presently running software, such as embedded software that controls one or more ECUs, for which an update is desired. The determination may be made in response to the identification of data in a database that is indicative of software versions currently being run by one or more vehicles. Such a database may be maintained by the TSP, by an original equipment manufacturer (OEM), or by another entity. The determination may also be made in response to a communication received from the vehicle. Such a communication received from the vehicle may be responsive to a request broadcast to the fleet of vehicles by the TSP.

Upon determining that the vehicle is running software for which an update is desired, the TSP transmits instructions to the vehicle to make preparations for the remote reflash event. In some implementations, the instructions may cause the vehicle to obtain a higher level of battery charge during its next drive cycle or charging event in anticipation of the remote reflash event. The instructions transmitted by the TSP may instruct the vehicle to make other preparations as well. In some implementations, the preparations are designed to ensure that the vehicle is able to emerge from the remote reflash with sufficient battery charge to enable the vehicle to start, with a battery state of charge above a threshold level, or with some other condition being met.

The present disclosure further contemplates the administration or execution of the remote reflash event. In some implementations, a confirmation, which may include a current battery state of charge, is provided by the vehicle upon completion of the remote reflash event. In such implementations, the TSP may determine if the battery state of charge is low enough that a charging event is not desirable. In such implementations, the present disclosure contemplates that the TSP may transmit a signal to a communication device associated with a user account affiliated with the vehicle.

One implementation consists of a method, implemented at a server operated by a telematics service provider (TSP), for preparing a vehicle equipped with a telematics unit for a remote reflash event, the method comprising determining that the vehicle is a candidate for a remote reflash event, scheduling a remote reflash event for the vehicle, and transmitting, to the telematics unit, a notification of the scheduled remote reflash event, wherein the notification of the scheduled remote reflash event facilitates an increase in the stored energy level of a battery at the vehicle during a drive cycle that occurs prior to the remote reflash event to a pending reflash stored energy level.

An additional implementation consists of a method, implemented at a telematics unit in a vehicle, for preparing the vehicle for a remote reflash event, the method comprising receiving a notification of a pending remote reflash event from a server of a telematics service provider wherein the notification of a pending remote reflash event facilitates an increase in the stored energy level of a battery at the vehicle during a drive cycle that occurs prior to the remote reflash event to a pending reflash stored energy level.

A further implementation consists of a system for preparing a vehicle for a remote reflash event, the system comprising a server operated by a telematics service provider, the server configured to determine that the vehicle is a candidate for a remote reflash event, to schedule the remote reflash event, to transmit a notification of the remote reflash event to the vehicle, and to transmit instructions for preparing for the remote reflash event to the vehicle and the vehicle, wherein the vehicle is equipped with a telematics unit configured to receive a notification of the remote reflash event, to receive instructions for preparing for the remote reflash event, and to transmit a confirmation that the remote reflash event has been completed and a post-reflash stored energy level to the server.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
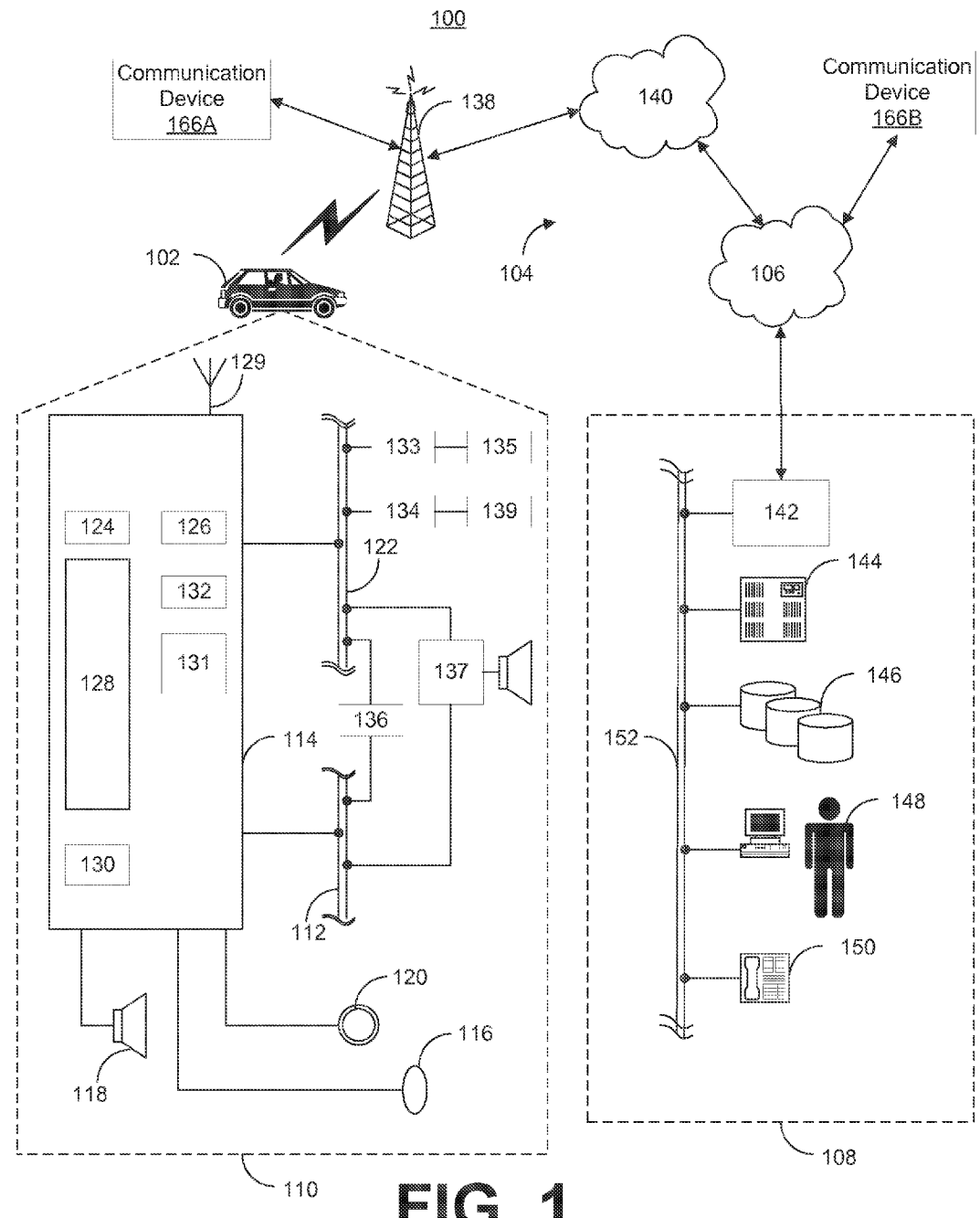
FIG. 1 is a schematic diagram of an operating environment for a mobile vehicle communication system usable in implementations of the present disclosure.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that may be used with the present systems and methods and generally includes a vehicle 102, a wireless carrier system 104, a land network 106 and a call center 108. It should be appreciated that the overall architecture, setup and operation, as well as the individual components of a system such as that shown in FIG. 1 are generally known in the art. Thus, the following paragraphs provide a brief overview of one such example information system 100. However, present systems and methods could be carried out in other environments as well.

Vehicle 102 is a mobile vehicle such as a motorcycle, car, truck, recreational vehicle (RV), boat, plane, etc., and is equipped with suitable hardware and software that enables it to communicate over system 100. The vehicle 102 may be powered by an electric motor that requires recharging, may be powered by an internal combustion engine, or may be powered by a variety of other power sources. Vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device providing a variety of services through its communication with the call center 108, and generally includes an electronic processing device 128, one or more types of electronic memory 130, a cellular chipset/component 124, a wireless modem 126, a dual antenna 129 and a navigation unit containing a GPS chipset/component 132. The GPS chipset/component is capable of determining the location of the vehicle with a high degree of accuracy. For example, the GPS chipset/component could determine that an electric vehicle is located at a particular electric vehicle charging station. In one example, the wireless modem 126 comprises, and is carried out in the form of, a computer program and/or set of software routines executing within the electronic processing device 128. The cellular chipset/component 124 and the wireless modem 126 may be called the network access device (NAD) of the telematics unit 114. The NAD 114 further includes a short-range wireless unit 131 capable of communicating via a WLAN or WPAN connection. For example, the wireless unit 131 may communicate by sending data packets over the internet via a WLAN connection. Furthermore, the wireless unit 131 may communicate with a user's mobile device such as a cellular phone, tablet computer, PDA, or the like, over a short-range wireless protocol. For example, in one implementation, the short-range wireless unit 131 includes a Bluetooth unit with an RF transceiver that communicates with a user's mobile device using Bluetooth protocol.

The telematics unit 114 provides a variety of services for subscribers. Examples of such services include: turn-by-turn directions and other navigation-related services provided in conjunction with the GPS based chipset/component 132; airbag deployment notification and other emergency or roadside assistance-related services provided in connection with various crash and or collision sensor interface modules 133 and sensors 135 located throughout the vehicle.

GPS navigation services are implemented based on the geographic position information of the vehicle provided by the GPS based chipset/component 132. A user of the telematics unit enters a destination using inputs corresponding to the OPS component, and a route to a destination is calculated based on the destination address and a current position of the vehicle determined at approximately the time of route calculation. Turn-by-turn (TBT) directions may further be provided on a display screen corresponding to the GPS component and/or through vocal directions provided through a vehicle audio component 137. It will be appreciated that the calculation-related processing may occur at the telematics unit or may occur at a call center 108.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the wireless carrier system 104 so that voice and/or data transmissions occur over the communications channel. Vehicle communications are enabled via the cellular chipset/component 124 for voice communications and a wireless modem 126 for data transmission. For example, data pertaining to a forecast of a utility's renewable energy mixture can be transmitted to the telematics unit 114 via the wireless modem 126.

To enable successful data transmission over the communications channel, wireless modem 126 applies some form of encoding or modulation to convert the digital data so that it can communicate through a vocoder or speech codec incorporated in the cellular chipset/component 124. Any suitable encoding or modulation technique that provides an acceptable data rate and bit error can be used with the present method. The dual mode antenna 129 services the GPS chipset/component and the cellular chipset/component.

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the call center 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the call center 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained.

Vehicle sensors 139, connected to various sensor interface modules 134 are operatively connected to the vehicle bus 122. Vehicle sensors 139 include sensors with capabilities that include but that are not limited to determining a battery's state of charge (e.g. as a percentage of the total charge capacity), the charging status of a battery (i.e. whether the battery is currently being charged), and the current rate at which the battery is being charged (e.g. as a rate of change of the percentage of capacity charged per unit time). The vehicle sensors 139 can also include hut are not limited to gyroscopes, accelerometers, magnetometers, emission detection and/or control sensors, and the like. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to call center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The call Center (OCC) 108, which may be owned, managed, or operated by a telematics service provider (TSP), is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. These various call center components are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected to various devices such as application servers 144 and databases 146. For example, the databases 146 could be designed to store subscriber profile records, subscriber behavioral patterns, or any other pertinent subscriber information. In particular, the databases 146 may store information pertaining to one or more communication devices linked to the accounts of one or more subscribers. Furthermore, the databases 146 may, in some implementations, store information pertaining to the versions of software run by vehicles linked to the accounts of one or more subscribers. Although the illustrated example has been described as it would be used in conjunction with a manned call center, it will be appreciated that the call center 108 can be any central or remote facility, manned or unmanned, mobile or fixed, to or from which it is desirable to exchange voice and data.

Communication devices 166 are communicatively connected to call center 108 and vehicle hardware 110. Communication device 166A is connected to the call center 108 and the vehicle hardware 110 through wireless carrier system 104, while communication device 166B is connected to the call center 108 and the vehicle hardware 110 through land network 106. The communication devices 166 may be any of a smart phone, a tablet computer, a personal assistant (PDA), a laptop computer, a desktop computer, or any other device capable of sending and receiving transmissions via a voice or data network. The communication devices 166 may receive information pertaining to remote reflash events, including a confirmation that a remote reflash event was successfully completed or a signal that a remote reflash has resulted in a. battery state of charge that may not meet the user's potential needs.

In general terms, not intended to limit the claims, the example environment depicted by FIG. 1 may be used by systems and methods that utilize the communicative connections between a telematics service provider (TSP), a telematics unit of a vehicle, and a communications device in order to schedule, prepare the vehicle for, administer, and provide acknowledgement notifications of the completion of a remote reflash event. Remote reflash events update software in the electronic control units (ECUs) of a vehicle. Such software may include but is not limited to embedded software that controls an individual ECU or other onboard computer. ECUs running software that may be updated in a remote reflash event include but are not limited to an engine control module (ECM), a transmission control module (TCM), powertrain control module (PCM), an electronic brake control module (EBCM), an anti-lock brake system (ABS) or a body control module (BCM), a door control unit (DCU), a seat control unit (SCU), and numerous other control modules that manage the various electronic systems in the vehicle. For example, the ECM may run software that controls, amongst other functions, spark plug firing, fuel usage, engine idling speed, emissions, and performance, and the TCM may run software that controls, amongst other functions, the operation of a vehicle's transmission and torque converter.

During a remote reflash event, the telematics unit 114 of the vehicle 102 acquires updated software from the TSP, e.g. from a server located at call center 108, and may further acquire computer executable instructions from the TSP for causing one or more of the vehicle's onboard computers to install the newly received updated software in order to replace or update prior versions of the software run by the onboard computer systems. In some implementations, the vehicle 102 may have a computer readable medium that is configured, prior to the remote reflash event, with computer executable instructions for facilitating installation of the new software into the vehicle's onboard computer systems in order to replace or update the prior versions that were previously loaded and run by the onboard computer systems.

Figure 2:
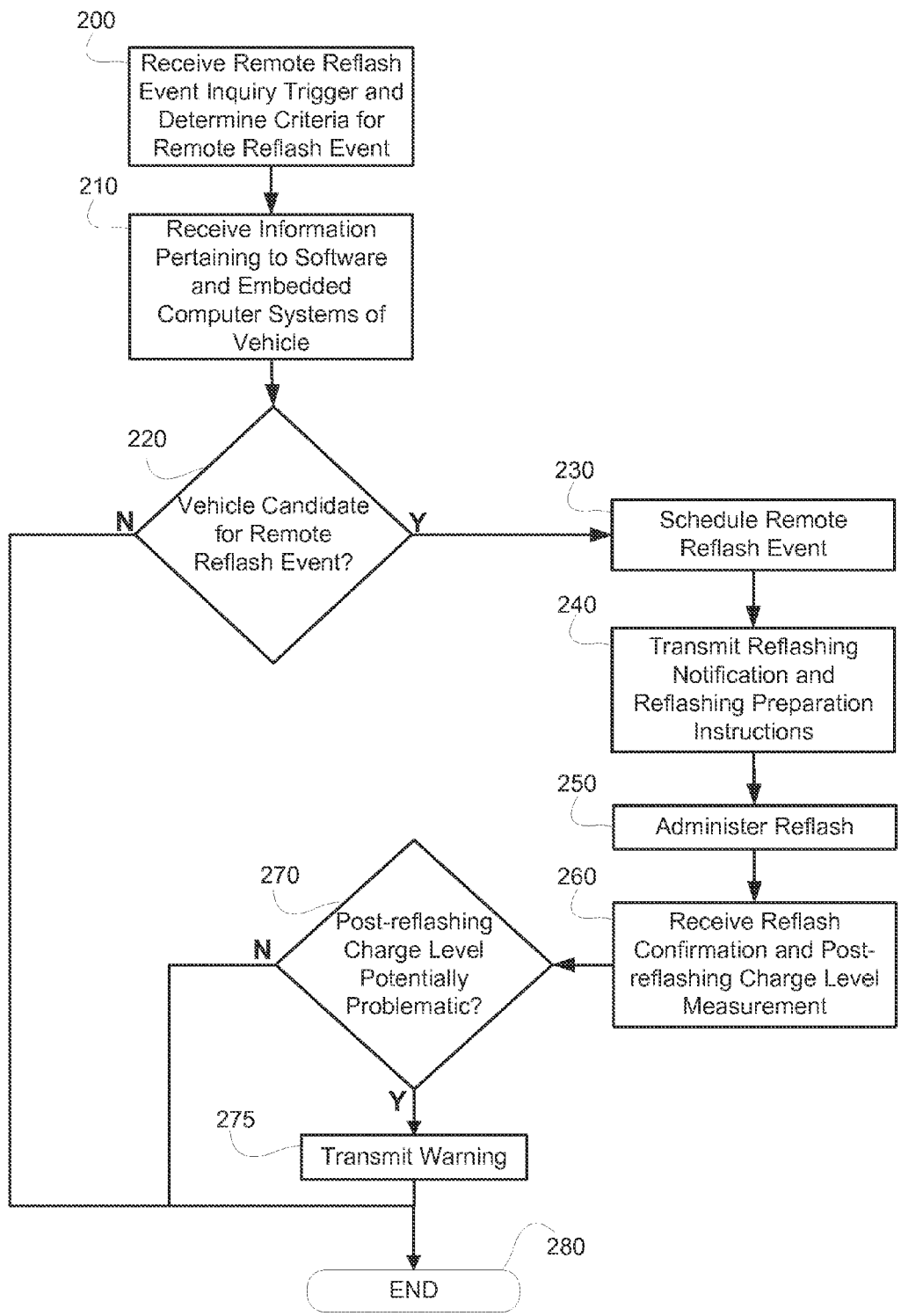
FIG. 2 is a flow chart summarizing an example process executed by a telematics service provider for scheduling a remote reflash event, notifying a vehicle of the scheduled remote reflash event, preparing the vehicle for the remote reflash event, and handling remote reflash completion acknowledgments.

FIG. 2 is a flow chart summarizing an example process executed by a telematics service provider for scheduling a remote reflash event, notifying a vehicle of the scheduled remote reflash event, preparing the vehicle for the remote reflash event, and handling remote reflash completion acknowledgments. At step 200, the process receives a trigger for a remote reflash inquiry and determines the criteria for participation in a remote reflash event. The trigger received at step 200 may be but is not limited to an announcement from an OEM or third party developer that a new software version is available, an announcement from an OEM or third-party software developer that an update for a particular software version is desired, a message from a TSP that a particular vehicle is scheduled for a software update, and a message from the telematics unit 114 requesting a software update check. Additionally, numerous other types of communications between the telematics unit 114, the TSP, and OEMs, third party software developers, and other entities may trigger a remote reflash event inquiry. For example, after a maintenance examination of the vehicle, a dealership or other vehicle maintenance service provider may transmit a request to a TSP that triggers a remote reflash event. Determining the criteria that must be met by a vehicle in order for the vehicle to be considered a candidate for the remote reflash event may include information indicating that all vehicles of a particular make and model running a particular software version may be candidates for a remote reflash event. In addition, information determining whether a remote reflash event for a particular vehicle is mandatory, recommended, optional, or otherwise classified may also be received at step 200. For example, a trigger received at step 200 may be an indication that a software version 2.4 is available and may be accompanied by information indicating that a remote reflash event is desired for vehicles running software version 2.2 or earlier and that a remote reflash event is suggested for vehicles running software version 2.3.

In various implementations, determining the criteria for participation in a remote reflash event at step 200 may be performed by a TSP, by an original equipment manufacturer (OEM), by a software developer, by the vehicle 102 itself, or by any other entity that has information pertaining to available software versions or by any group of entities that collectively have access to such information. In some implementations, an original equipment manufacturer (OEM) may identify a particular version, or multiple versions, of software run by one or more ECUs or other onboard computers, for which an update in a remote reflash event is desired. In alternative implementations, the TSP or a third party software developer may identify a particular version, or multiple versions, of software run by one or more ECUs or other onboard computers for which an update is desired. In some implementations, outdated versions of the software are identified as candidates for updating, while in other implementations a new version of software is identified as a candidate for installation. Similarly, installations and updates may be categorized according the benefit they may provide. For example, installations and updates may be designated as recommended, suggested, or optional. Other terms may be used to designate categories into which particular updates or installations are placed according to the benefit they may provide. In some implementations, the OEM, TSP, or third party software developer may further specify that the software update is pertinent only to a particular make or model of vehicle, or to all particular makes or models of vehicles in a particular group of makes and models of vehicles.

At step 210, information pertaining to the embedded computer systems of the vehicle 102 and the software currently loaded on the embedded computer systems of the vehicle 102, such as one or more electronic control units, is acquired. The information acquired at step 210 may include but is not limited to version identification information for one or more software programs, information pertaining to the developer of one or more software programs, error messages generated by one or more software programs, and installation information of one or more programs currently installed at the vehicle 102. In general, any information necessary for or beneficial to determining whether or not the vehicle 102 is a candidate for a remote reflash event may be acquired at step 210. The information acquired at step 210 may be received from the telematics unit 114 of the vehicle 102. Alternatively, the information acquired at step 210 may be obtained from a database, from an OEM responsible for the manufacture of the vehicle 102, or from another entity.

At step 220, the process determines whether or not the vehicle 102 is a candidate for a remote reflash event. Determining whether or not the vehicle 102 is a candidate for a remote reflash event may involve determining whether or not the information received at step 210 indicates that the vehicle 102 satisfies criteria for a remote reflash event received at step 200. Additionally, information stored at a database, e.g. user account information or user account records, may be consulted in order to determine whether or not the vehicle 102 is a candidate for a remote reflash event. If it is determined at step 220 that the vehicle 102 does not meet the criteria for candidacy for a remote reflash event, the process proceeds to step 280 where the process ends. However, if it is determined that the vehicle 102 satisfies the criteria for being a candidate for a remote reflash event, the process proceeds to step 230.

In some implementations, the vehicle 102 may determine at step 220 whether or not it is a candidate for a remote reflash event. In such implementations, data pertaining to the makes and/or models of vehicle that may be candidates to undergo a remote reflash event and pertaining to the particular version or versions of software and particular ECUs running such software that may be candidates for updating during the remote reflash event is transmitted directly to the vehicle 102. For example, an onboard computer at the vehicle 102 may determine at step 220 whether or not the vehicle 102 is a candidate for the remote reflash event by determining whether the vehicle 102 is of a make or model identified by the data transmitted to the vehicle 102 and by further determining if any of the vehicle's onboard computers run software identified by the data. In some implementations, if the vehicle 102 determines at step 220 that it is a candidate for a remote reflash event, it transmits a confirmation of its candidacy to the TSP, while in other implementations, the vehicle 102 transmits a confirmation of its candidacy to the OEM or third party software developer.

In other implementations, the TSP may determine at step 220 whether or not a particular vehicle is a candidate for a remote reflash event. In implementations where the data pertaining to the makes and/or models of vehicle that may be candidates to undergo a remote reflash event and pertaining to the particular version or versions of software and particular ECUs running such software that may be candidates for updating during the remote reflash event is transmitted to the TSP, the TSP may consult a database containing data pertaining to each vehicle subscribing to the services provided by the TSP at step 220. The database may index those vehicles by vehicle identification number (VIN), or the database may index those vehicles through a different method. The database may contain, for the vehicle 102, a list of onboard computers and software versions run by each of the onboard computers of the vehicle 102. In some implementations, if the database does not contain an entry of a complete entry for the vehicle 102, the TSP may transmit a request to the vehicle 102 and request that the vehicle 102 transmit the data missing from the database to the TSP. Through comparing the data stored for the vehicle 102 with the data pertaining to the makes and/or models of vehicle that may be candidates to undergo a remote reflash event and pertaining to the particular version or versions of software and particular ECUs running such software that may be candidates for updating during the remote reflash event, the TSP determines at step 220 whether the vehicle 102 is a candidate for the remote reflash event.

At step 230, the process schedules a remote reflash event. Scheduling a remote reflash event may involve determining one or more time intervals when the TSP has sufficient resources available to administer a remote reflash event. In addition, the scheduling may involve querying a user of the vehicle 102 or a user that owns a user account affiliated with the vehicle 102. Such a query may include multiple available time slots and request that the user pick one for administration of the remote reflash event. Alternatively, such a query may request that the user select a time slot for administration of the remote reflash event with no restrictions on the time slots available for user selection. The query sent to the user may also include information regarding the software that will be updated in the remote reflash event and allow the user to select additional updates to perform or to cancel certain updates. In various implementations, the query may also provide the user with an option to choose to not allow the reflash event to proceed. Such a veto or cancellation option may be preferable where the potential remote reflash event is classified as optional or suggested with respect to the particular vehicle. In other implementations, no user interaction is required for the scheduling of a reflash event. The reflash event may be scheduled based on resource availability or a number of other considerations. In various implementations, the remote reflash event may be scheduled at a particular time, at a particular place, or at a particular time and place. For example, a remote reflash event could be scheduled for the next point in time at which the telematics unit 114 of the vehicle 102 establishes a connection with a particular wifi network.

At step 240, the process transmits a notification of the scheduled remote reflash event and instructions for preparing for the remote reflash event to the telematics unit 114 of the vehicle 102. The instructions for preparing for the remote reflash event may include instructions for a battery charging system of the vehicle 102 to charge the battery of the vehicle to a higher stored energy level during each drive cycle until the remote reflash event is administered. Alternatively, the instructions may direct the charging system of the vehicle 102 to charge the battery to the pending reflash stored energy level each time the battery is recharged during a particular time window. Such time window may end at the time the reflash event is scheduled or upon receiving a confirmation that the reflash event has occurred. For example, a pending reflash stored energy level may be determined by the TSP and the instructions may direct the battery charging system to charge the vehicle to a higher stored energy level. In various implementations, the pending reflash stored energy level may be determined by the TSP, by the telematics unit 114 of the vehicle 102, by the charging system of the vehicle 102, by the OEM that manufactured the vehicle 102, or by another entity.

The pending reflash stored energy level may be constant for all reflash events across a particular make and model of vehicle, or the pending reflash stored energy level may be constant for all makes and models of vehicle. In some implementations, an estimate of the amount of data that will be transmitted to the vehicle during the remote reflash event may be used to determine the pending reflash level. In such implementations, the pending reflash stored energy level may be dynamically adjusted across each individual reflash event. In similar implementations, the pending reflash stored energy level may be determined according to additional information that includes but is not limited to characteristics of the software programs that are to be updated during the reflash event, the location of the planned reflash event, characteristics of the connection that will be used during the administration of the reflash event, user account settings established at a user account affiliated with the vehicle, and historical diagnostic information pertaining to the vehicle 102. The pending reflash stored energy level may be established as a percentage of the maximum stored energy level of the battery, may be established uniformly for all reflash events, or may be established according to the characteristics of the particular reflash event.

Reflash preparation instructions transmitted to the vehicle 102 at step 240 can also include instructions for the telematics unit 114 of the vehicle 102 to provide a reminder to a user of the vehicle 102. Such reminders may include instructions directing the user to travel to a particular location at which the reflash event has been scheduled. Furthermore, reflash preparation instructions may specify that the vehicle 102 should verify the state of charge prior to the beginning of the reflash event, at the time at which the reflash event is scheduled to begin, or upon commencement of the reflash event. If the vehicle stored energy level is below a threshold level, which may be specified in the reflash preparation instructions and need not equal the pending reflash stored energy level, the telematics unit 114 may cancel the reflash event.

In alternative implementations, no instructions for preparing for the remote reflash event are transmitted to the telematics unit at step 240. Instead, the notification transmitted to the telematics unit at step 240 triggers the preparation of the vehicle for the upcoming reflash event. In such implementations, the receipt of the notification at step 240 triggers sets into motion a process that the telematics unit 114 of the vehicle 102 is programmed to execute. The process may include issuing instructions to a battery charging system of the vehicle to charge the vehicle battery to a higher stored energy level during each drive cycle until the remote reflash event is administered or that otherwise facilitate the preparation of the vehicle for an upcoming reflash event.

At step 250, the remote reflash event is administered. Once the remote reflash event has been scheduled and instructions for preparing for the remote reflash event have been sent to the vehicle, the TSP administers the remote reflash event at step 250. Administration of the remote reflash event involves data transmissions between the TSP and the telematics unit 114 of the vehicle 102. Additionally, the remote reflash events may involve data transmissions between an OEM and the vehicle 102 or between a third party software developer and the vehicle 102. For example, administration of the remote reflash event at step 250 may involve the receipt of instructions by the telematics unit 114 to acquire data representing software that is to be installed at the vehicle's onboard computer systems from a server maintained by an OEM, third party software developer, or other entity. The data transmissions may be carried out via the wireless carrier system 104 or via a short-range communication connection established via the wireless unit 131. For example, the telematics unit 114 may connect to the internet via a WLAN connection established through the wireless unit 131. Administration of the remote reflash event may also involve installation of software, including updated versions of embedded software executed by one or more ECUs at the vehicle 102, by onboard computers located at the vehicle 102.

Subsequently, at step 260, the TSP receives a confirmation from the telematics unit 114 of the vehicle 102 that the remote reflash event has been administered. Furthermore, at step 260 the telematics unit 114 also transmits data pertaining to the post-reflashing stored energy level of the vehicle 102. The data pertaining to the post-reflashing stored energy level of the vehicle 102 may be indicative of an inability for the vehicle to start or for the inability of the vehicle to complete anticipated travel.

At step 270, the TSP determines whether or not the post-reflashing stored energy level is potentially undesirable. Determining whether the post-reflashing stored energy level is potentially undesirable may involve determining anticipated travel of the vehicle and determining whether the vehicle will be able to perform such travel prior to a subsequent charge event. Determining whether or not the post-reflashing stored energy level is undesirable may also include determining whether the stored energy level indicates that the battery is not charged to a sufficient level so as to enable the vehicle 102 to start its engine.

If the post-reflashing stored energy level is not potentially undesirable, the process proceeds to step 280 where the process ends. However, if the post-reflashing stored energy level is potentially undesirable, the process proceeds to step 275 where a signal is transmitted. The signal may be transmitted to a user of the vehicle, to a communication device affiliated with a user account with which the vehicle is affiliated, such as one of the communication devices 166, or to vehicle emergency response personnel. For example, the signal may be transmitted to a dispatcher capable of dispatching personnel who can recharge the vehicle's battery. After the signal is transmitted at step 275, the process proceeds to step 280 where the process ends.

Figure 3:
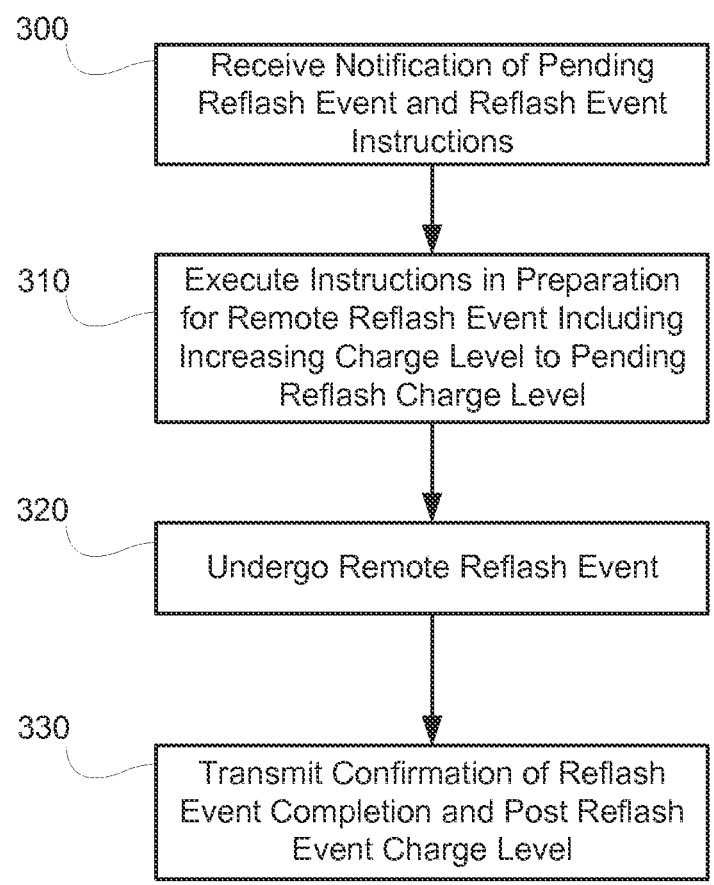
FIG. 3 is a flow chart summarizing an example process executed by a telematics unit of a vehicle for preparing for and undergoing a remote reflash event.

FIG. 3 is a flow chart summarizing an example process executed by a telematics unit of a vehicle for preparing for and undergoing a remote reflash event. At step 300, the telematics unit receives a notification of a pending reflash event and instructions for preparing for the pending reflash event. The notification of the pending reflash event may include information pertaining to the time at which the reflash event is scheduled or the location at which the reflash event is scheduled. Furthermore, the notification may include information pertaining to actions that will be executed during the reflash event. For example, the notification may indicate identities of one or more software versions that will be updated or one or more ECUs running software that will be updated. The instructions received at step 300 direct the vehicle 102 to take measures to prepare for the remote reflash event such that the rehashing can be successfully accomplished white leaving the vehicle in a fully operational state. For example, the instructions may direct a charging module of the vehicle to charge a vehicle battery to a stored energy level that is higher than the default stored energy level in order to enable the vehicle to undergo a remote reflash event and to retain sufficient battery charge to achieve satisfactory vehicle operation. For example, the instructions may direct the charging module of the vehicle 102 to charge the battery to a level equal to ninety percent of the maximum charge capacity when a remote reflash event is pending while the default stored energy level is eighty percent of the maximum charge capacity.

At step 310, the vehicle 102 executes the instructions received at step 300. The execution of the instructions received at step 300 may be a process that continues from the time at which the instructions are received until the time at which the vehicle undergoes the remote reflash event. Furthermore, executing the instructions received at step 300 may involve repetitions. For example, the vehicle may undergo multiple drive cycles, i.e. cycles during which a battery at the vehicle 102 is used to start the vehicle's engine or provide power to the vehicle to enable travel and during which the battery is subsequently recharged. Therefore, instructions to charge the vehicle's battery to a level above the default stored energy level may be repeated at each drive cycle prior to the remote reflash event.

At step 320, the vehicle undergoes the remote reflash event. Undergoing the remote reflash event involves receiving communications from a TSP and installing updated software versions at one or more embedded computer systems of the vehicle. In addition to receiving communications from the TSP, the vehicle 102 may also receive communications from an OEM or from a software developer during the remote reflash event. At step 330, the vehicle transmits a confirmation indicating completion of the remote reflash event and further transmits information indicating the post reflash stored energy level of the battery.

It will be appreciated by those of skill in the art that the execution of the various machine-implemented processes and steps described herein may occur via the computerized execution of computer-executable recommendations stored on a tangible computer-readable medium, e.g., RAM, ROM, PROM, volatile, nonvolatile, or other electronic memory mechanism. Thus, for example, the operations performed by the telematics unit may be carried out according to stored recommendations or applications installed on the telematics unit, and operation performed at the call center may be carried out according to stored recommendations or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, implemented at a server operated by a telematics service provider (TSP), for preparing a vehicle equipped with a telematics unit for a remote reflash event, the method comprising:
   determining that the vehicle is a candidate for a remote reflash event;
   scheduling a remote reflash event for the vehicle; and
   transmitting, to the telematics unit, a notification of the scheduled remote reflash event;
   wherein the notification of the scheduled remote reflash event operates as an instruction to the vehicle charging system to charge a battery at the vehicle to a pending reflash stored energy level exceeding a default stored energy level, which is specified for the battery when a reflash event is not pending, during a drive cycle that occurs prior to the remote reflash event.

2. The method of claim 1, the method further comprising:
   receiving, at the server, information specifying criteria for a candidate for a remote reflash event; and
   receiving, at the server, information indicating characteristics of embedded software installed at the vehicle;
   wherein the determining that the vehicle is a candidate for a remote reflash event comprises determining, by the server based on the information specifying criteria for a candidate for a remote reflash event and information indicating characteristics of embedded software installed at the vehicle, that the vehicle is a candidate for a remote reflash event.

3. The method of claim 2, wherein the information specifying criteria for a candidate for a remote reflash event comprises information selected from one of the group consisting of: information identifying a version of embedded software configured to be executed by an electronic control unit (ECU), information identifying a vehicle make, and information identifying a vehicle model.

4. The method of claim 3, wherein the information identifying the version of embedded software configured to be executed by the ECU is accompanied by information indicating a classification of the version; and
   wherein the classification of the version indicates that an original equipment manufacturer considers installation of the version to be one of the group consisting of: mandatory, recommended, or optional.

5. The method of claim 1, the method further comprising:
   determining characteristics of the remote reflash event; and
   based on the characteristics of the remote reflash event, calculating the pending reflash stored energy level.

6. The method of claim 5, wherein the characteristics of the remote reflash event include one of the group consisting of: the amount of data to be transferred to the telematics unit during the remote reflash event, the size of an embedded software file to be transferred to the telematics unit during the remote reflash event, and the amount of electrical power required by the vehicle to execute the remote reflash event.

7. The method of claim 1, wherein scheduling the remote reflash event comprises allocating wifi bandwidth at a remote reflashing station to the remote reflash event.

8. The method of claim 1, wherein the notification of the remote reflash event facilitates prompting a user to confirm the remote reflash event and transmission of a confirmation received from the user to the server.

9. The method of claim 1, wherein scheduling the remote reflash event comprises:
   transmitting, to the telematics unit, instructions to prompt a user of the vehicle to indicate a time interval during which the remote reflash event may be administered; and
   receiving, from the telematics unit, information indicating a time interval selected by the user.

10. The method of claim 9, wherein scheduling the remote reflash event further comprises:

transmitting, to the telematics unit, instructions to prompt the user of the vehicle to indicate a location at which the remote reflash event may be administered; and receiving, from the telematics unit, information indicating a location selected by the user.

11. The method of claim 1, the method further comprising:

administering the remote reflash event;

wherein data transmitted to the telematics unit during administration of the remote reflash event is transmitted via one of the group consisting of: a WLAN connection, a WPAN connection, and a long-range wireless connection.

12. The method of 11, the method further comprising:

receiving a confirmation that the remote reflash event has been successfully completed, wherein the confirmation includes a stored energy level of the battery measured subsequent to the completion of the remote reflash event;

determining that the stored energy level of the battery is indicative of one of the group consisting of: the inability to start the vehicle and the inability of the vehicle to complete anticipated travel; and transmitting a message.

13. A method, implemented at a telematics unit in a vehicle, for preparing the vehicle for a remote reflash event, the method comprising:

receiving a notification of a pending remote reflash event from a server of a telematics service provider wherein the notification of a pending remote reflash event operates as an instruction to the vehicle charging system to charge a battery at the vehicle to a pending reflash stored energy level exceeding a default stored energy level, which is specified for the battery when a reflash event is not pending, during a drive cycle that occurs prior to the remote reflash event; and charging the battery in accordance with the notification.

14. The method of claim 13, the method further comprising:

prior to receiving a notification of a pending remote reflash event, receiving a request for information pertaining to software installed at the vehicle and transmitting information pertaining to software installed at the vehicle to the server at the telematics service provider.

15. The method of claim 13, wherein the pending reflash stored energy level is calculated according to one of the group consisting of: the amount of data to be transferred to the telematics unit during the remote reflash event and the expected amount of electrical power required by the vehicle to execute the remote reflash event.

16. A system for preparing a vehicle for a remote reflash event, the system comprising:

a server operated by a telematics service provider, the server configured to determine that the vehicle is a candidate for a remote reflash event, to schedule the remote reflash event, to transmit a notification of the remote reflash event to the vehicle, and to transmit instructions for preparing for the remote reflash event to the vehicle; and the vehicle, wherein the vehicle is equipped with a telematics unit configured to receive a notification of the remote reflash event, to receive instructions for preparing for the remote reflash event, and to transmit a confirmation that the remote reflash event has been completed and a post-reflash stored energy level to the server, wherein the instructions for preparing for the remote reflash event comprise instructions to take action to increase the state of charge of a battery at the vehicle during a drive cycle that occurs prior to the remote reflash event to a pending reflash stored energy level exceeding a default stored energy level specified for the battery when a reflash event is not pending.

17. The system of claim 16, wherein the server is further configured to determine characteristics of the remote reflash event and based on the characteristics of the remote reflash event, calculate the pending reflash stored energy level.

18. The system of claim 17, wherein the telematics unit is further configured to transmit a confirmation that the remote reflash event has been completed and a post-reflash stored energy level to the server.

19. The system of claim 18, wherein the server is further configured to determine whether the post-reflash stored energy level is potentially indicative of an undesirable condition and to transmit a message if the post-reflash stored energy level is potentially indicative of an undesirable condition.

\* \* \* \* \*